Aug. 2, 1960 W. C. ESPENLAUB 2,947,953

SIGNAL-MODIFYING APPARATUS

Filed June 20, 1955 2 Sheets-Sheet 1

Aug. 2, 1960 W. C. ESPENLAUB 2,947,953

SIGNAL-MODIFYING APPARATUS

Filed June 20, 1955 2 Sheets-Sheet 2

2,947,953

SIGNAL-MODIFYING APPARATUS

Walter C. Espenlaub, Syosset, N.Y., assignor to Hazeltine Research, Inc., Chicago, Ill., a corporation of Illinois Filed June 20, 1955, Ser. No. 516,349

4 Claims. (Cl. 333—28)

Figure 1:
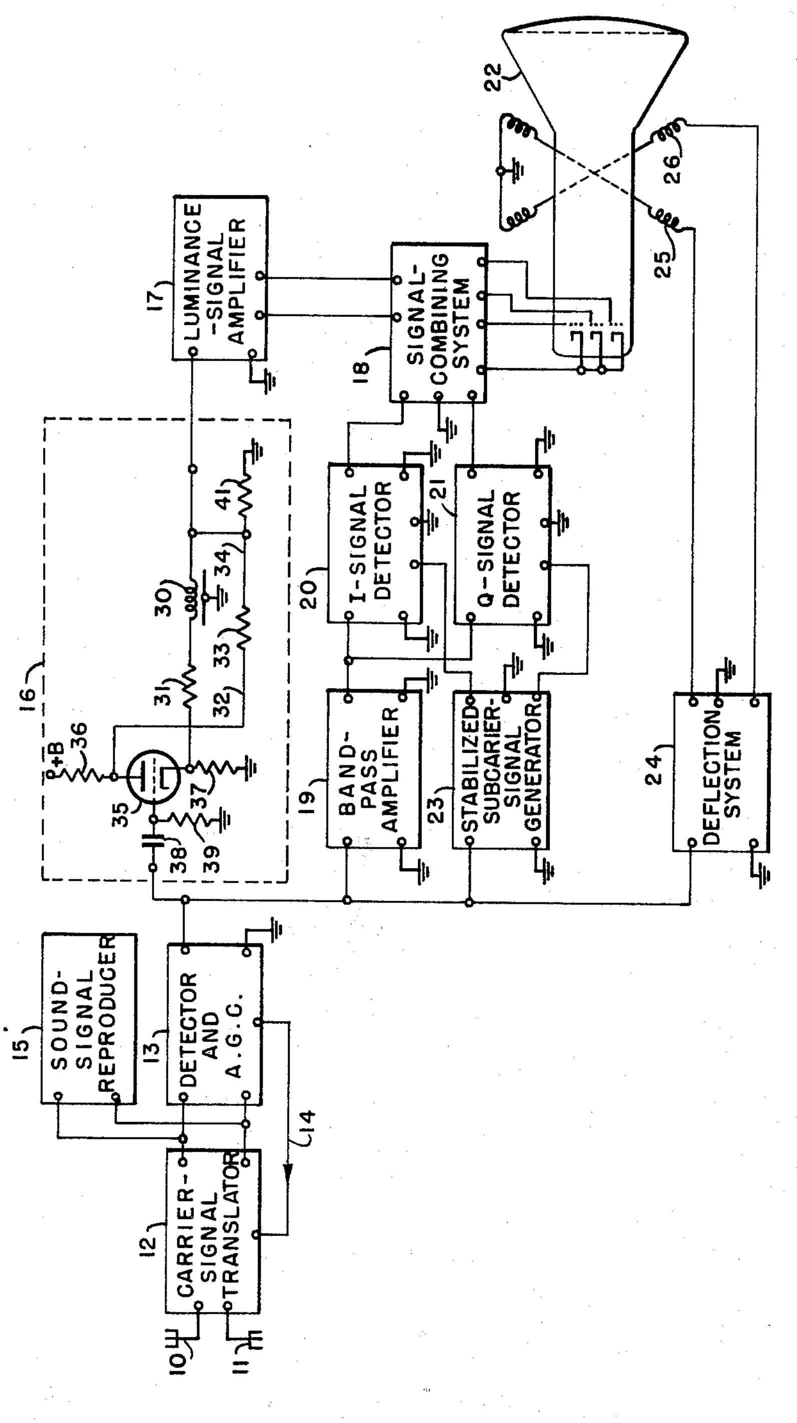

This invention relates to signal-modifying apparatus and, particularly, to such apparatus for modifying the amplitude and phase of various frequency components of an input signal translated thereby. The apparatus, while of general applicability, is particularly useful in apparatus, such as color-television receivers, normally having a time-delay network associated therewith.

In a color-television receiver, for example, there is a channel for translating the luminance signal and a channel, composed of one or more subchannels, for translating the chrominance signal. As is well known, the band width of the luminance channel is appreciably greater than the band width of the chrominance channel. One result of this band-width difference is that the narrow band chrominance channel introduces a greater time delay than the wide band luminance channel. It is, therefore, conventional practice to include a time-delay network, such as a delay line, in the luminance channel for equalizing the time delays of the luminance and chrominance channels so that the luminance and chrominance information may be supplied to the picture tube with the proper time synchronization.

It is also generally known that undesirable limitations or deficiencies of the color-television receiver including the picture tube thereof may be compensated for by suitably modifying the frequency-translating characteristics of, for example, the luminance channel. In this manner, the appearance of the reproduced color image may be improved, for example, by boosting or accentuating the high-frequency components of the signals translated by the luminance channel.

It is an object of the invention, therefore, to provide new and improved signal-modifying apparatus including a time-delay network for modifying the amplitude and phase of various frequency components of an input signal translated thereby.

It is another object of the invention to provide new and improved signal-modifying apparatus for use with other apparatus normally including a time-delay network, the signal-modifying apparatus utilizing the time-delay network as a component thereof for obtaining the further result of effecting a desired modification of the signal normally translated by the time-delay network.

It is a further object of the invention to provide new and improved signal-modifying apparatus for use in a color-television receiver to obtain high-frequency boost in, for example, the luminance channel with the addition of a small number of inexpensive components.

In accordance with the invention, color-television signal-translating apparatus for boosting the amplitude of high frequency components of a luminance signal translated thereby comprises a first signal-translating path for translating all the frequency components of the luminance signal with a predetermined time delay. The apparatus also includes a second signal-translating path for independently translating all the frequency components of the luminance signal with a time delay less than that of the first path by an amount substantially one-half the period of the frequency component which is to receive the largest boost. The apparatus also includes circuit means for inverting the polarity of the signal translated by one of the paths relative to the polarity of the signal translated by the other of the paths. The apparatus further includes circuit means for adding together only these two signals after the mentioned translation and relative polarity inversion to produce a resultant output signal corresponding to the luminance signal but with boosted high-frequency components.

For a better understanding of the present invention, together with other and further objects thereof, reference is had to the following description taken in connection with the accompanying drawings, and its scope will be pointed out in the appended claims.

Figure 2:
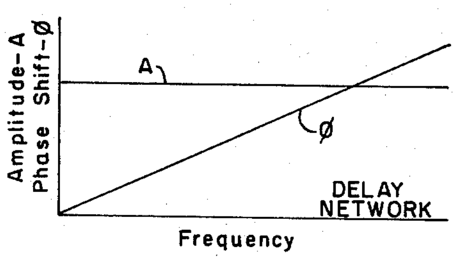
Figure 3:
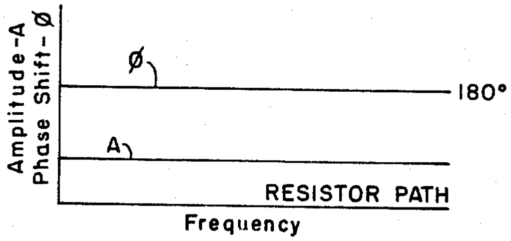
Figure 4:
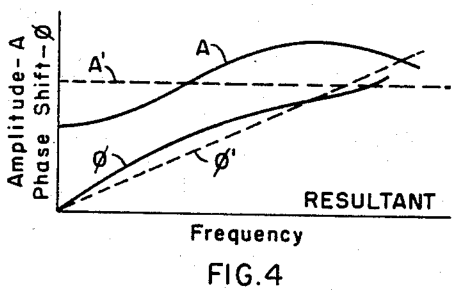

Referring to the drawings:

Fig. 1 is a circuit diagram, partly schematic, of a complete color-television receiver including signal-modifying apparatus constructed in accordance with the present invention, and Figs. 2, 3, and 4 are graphs used in explaining the operation of the signal-modifying apparatus of Fig. 1.

*Description and operation of color-television receiver*

Referring to Fig. 1 of the drawings, the color-television receiver there represented comprises an antenna system, 10, 11 coupled to a carrier-signal translator 12 for supplying the received color-television signal thereto. The carrier-signal translator 12 is of conventional construction and may include, for example, a radio-frequency amplifier, an oscillator-modulator, and an intermediate-frequency amplifier for amplifying the received color-television signal and changing the carrier frequency thereof to an intermediate-frequency value.

The intermediate-frequency signal from the carrier-signal translator 12 is supplied to a detector and AGC circuit 13, of conventional construction, which is effective to remove the video-frequency components from the intermediate-frequency signal and supply these video-frequency components, which constitute a composite video-frequency signal including luminance, chrominance, and synchronizing information, to the output terminals thereof. The unit 13 is also effective to develop a control voltage representative of the amplitude of the carrier signal, which control voltage is fed back by way of conductor 14 for automatically controlling the gain of appropriate stages of the carrier-signal translator 12 in a conventional manner.

Also coupled to the output terminals of the carrier-signal translator 12 is a sound-signal reproducer 15 for separating, amplifying, and detecting the sound component of the intermediate-frequency signal. The sound-signal reproducer 15 is of conventional construction and may include, for example, a frequency-modulation detector, audio-frequency amplifier, and a loudspeaker for converting the audio-frequency signal into audible sound signals.

Coupled to the output terminal of the detector 13 is a luminance channel for amplifying and translating the luminance component of the composite video signal. The luminance channel may include, for example, signal-modifying apparatus 16, to be discussed in detail hereinafter, and a luminance-signal amplifier 17 of conventional construction. The amplified luminance signal is, in turn, supplied by the luminance-signal amplifier 17 to a signal-combining system 18.

The composite video signal from the detector of unit 13 is also supplied to a chrominance channel for translating the chrominance component thereof. The chrominance channel may include, for example, a band-pass amplifier 19 for amplifying and translating the chrominance component which, in turn, is supplied to an I-signal detector 20 and a Q-signal detector 21. The I-signal detector 20 may be, for example, a synchronous detector of conventional construction and is effective to remove chrominance information from the chrominance subcarrier at a desired phase angle in a conventional manner. Likewise, the Q-signal detector 21 may be a conventional synchronous detector for removing chrominance information from the chrominance subcarrier at a phase angle which is in quadrature with the phase angle selected by the I-signal detector 20. In this manner, the chrominance information is split into an I-signal chrominance subchannel and a Q-signal chrominance subchannel.

Both the I-signal detector 20 and the Q-signal detector 21 are, in turn, coupled to the signal-combining system 18 for supplying both the I and Q chrominance components thereto. The signal-combining system 18 may include conventional matrixing circuits for combining the luminance signal and the I and Q chrominance signals supplied thereto in order to develop the desired red, green, and blue color signals which, in turn, are supplied to the control electrodes of a conventional three-gun display device 22 of the shadow-mask type. The display device or picture tube 22 then operates in a conventional manner to produce the color image on the display screen thereof.

The composite video signal from the detector of unit 13 is also supplied to a stabilized subcarrier signal generator 23 of conventional construction. The generator 23 may include, for example, suitable oscillator and phase-shift circuits for producing a pair of 3.58 megacycle subcarrier reference signals in phase quadrature with one another, these reference signals being supplied to the I-signal and Q-signal detectors 20 and 21 for enabling detection of the desired chrominance components therein. The generator 23 also includes conventional phase-comparing and reactance-tube circuits which are responsive to the subcarrier frequency sync burst component of the composite video signal supplied thereto for synchronizing the operation of the oscillator portion of generator 23 with the subcarrier frequency sync burst component.

The composite video signal from the detector of unit 13 is additionally supplied to a deflection system 24 of conventional construction. Such deflection system may include, for example, a signal-separating circuit, a line-scanning generator, and a field-scanning generator which are responsive to the scanning synchronization component of the composite video signal for supplying synchronized line-scanning signals and synchronized field-scanning signals to the corresponding horizontal deflection winding 25 and vertical deflection winding 26 disposed adjacent the picture tube 22. In this manner, the electron beam of the picture tube 22 is caused to scan the phosphor screen thereof in a conventional manner.

*Description of signal-modifying apparatus*

Referring again to Fig. 1 of the drawings, there is represented signal-modifying apparatus 16 constructed in accordance with the present invention and comprising a first signal-translating path for translating the input signal with a predetermined time delay. This path includes, for example, a time-delay network 30 and a coupling resistor 31.

The signal-modifying apparatus 16 further includes a second signal-translating path for independently translating the input signal with a time delay different from that of the first path which includes the delay network 30. More specifically, this second signal-translating path may constitute a path for independently and instantaneously translating all frequency components of the input signal. In this case, the second path may include a conductor 32, a resistor 33, and a further conductor 34. In any event, the time delay produced in the first path including the delay network 30 should exceed any time delay produced in the second path including the resistor 33 by an amount which is equal to one-half the period of the frequency component of the input luminance signal which is to receive the largest boost.

The signal-modifying apparatus 16 further includes circuit means for inverting the polarity of the signal translated by one of the paths relative to the polarity of the signal translated by the other of the paths. Such circuit means may comprise a phase-inverter circuit including, for example, a tube 35 having an anode load resistor 36 and a cathode load resistor 37 coupled thereto. In addition, a coupling network including a coupling condenser 38 and a grid-leak resistor 39 is coupled to the control electrode of such tube 35 for supplying thereto the composite video signal from the detector unit 13. As shown, for example, the coupling resistor 31 of the first signal-translating path may be coupled to the cathode resistor 37 while the conductor 32 of the second signal-translating path is coupled to the anode load resistor 36. In this manner, normal functioning of the tube 35 serves to invert the relative polarities of the signals supplied to the two signal-translating paths.

The signal-modifying apparatus additionally includes circuit means for combining these signals after the mentioned translation and relative polarity inversion to produce a resultant output signal corresponding to the input signal with amplitude- and phase-modified frequency components. Such circuit means may include, for example, an adding resistor 41 for combining the signals translated by the two paths in an additive manner to produce the desired output signal.

While the signal-modifying apparatus in the form shown in Fig. 1 includes all of the essential elements for practicing the present invention, it should be understood that there is considerable latitude in the specific manner in which these elements may be coupled and arranged with respect to one another. For example, the two signal-translating paths may be directly coupled to the detector unit 13 and the phase-inverter circuit, represented by tube 35, coupled in the latter portion of one of the paths just prior to the adding resistor 41. In other words, it is not critical as to just when the polarity inversion is produced, provided such inversion is produced before the signals translated by the two paths are combined across the adding resistor 41. With the phase-inverter circuit located as shown in Fig. 1, it may be desirable to include a blocking condenser in the second signal-translating path, for example between the conductor 32 and the resistor 33, in order to prevent the direct-current operating potential +B supplied to tube 35 from being supplied to subsequent circuits. In addition, the adding circuit represented by resistor network 33, 41 need not take the precise form as shown in Fig. 1 as alternative networks and connections will be readily apparent to those skilled in the art.

*Operation of signal-modifying apparatus*

Considering the operation of the signal-modifying apparatus just described, such operation shall be described with respect to the representative color-television environment shown in Fig. 1. More specifically, the operation shall be described where the apparatus of the present invention is utilized for boosting or accentuating the high-frequency components of the luminance signal translated by portions of the Fig. 1 receiver. The present invention, of course, is not limited to color-television receivers and may be employed with advantage in any environment where the dual features of time-delay equalization and signal modification within the limits of the present invention are desirable. In particular, within a color-television receiver itself, the present invention is not limited to modification of the luminance signal because, as will subsequently become apparent, an analogous situation exists with respect to the chrominance signal, that is, the signal-modifying apparatus of the present invention may also be used with advantage in the I-signal subchannel of the chrominance channel.

With the foregoing in mind, the operation of signal-modifying apparatus 16, constructed in accordance with the present invention, to boost the high-frequency components of the luminance signal will now be described. As mentioned, it is desirable to boost the amplitude of the high-frequency components of the luminance signal relative to the amplitude of the low-frequency components thereof in order to compensate for signal modification of a converse nature which may occur along the path traversed by the luminance signal such as, for example, in the carrier-signal translator 12. In other words, in order to achieve economical circuit design, the signal-translating characteristics of carrier-signal translators used in commercial television receivers are frequently such that the amplitude of the high-frequency luminance components is attenuated relative to the amplitude of the low-frequency luminance components. The high-frequency luminance components, of course, correspond to areas of rapid change in light value of the reproduced image, such as the edges of well-defined objects. Hence, restoration of the high-frequency components by the signal-modifying apparatus of the present invention serves to improve the sharpness or fine-detail content of the reproduced image.

To achieve the desired signal modification, the input signal, in this case the luminance signal, is supplied by way of the coupling condenser 38 to the phase-inverter circuit associated with tube 35. The tube 35 is effective to reproduce the input luminance signal across both the anode load resistor 36 and the cathode load resistor 37. These reproduced signals, however, differ in phase from one another by a factor of 180° due to the polarity-inverting action of the tube 35. In this manner, an in-phase replica of the luminance signal is supplied to the first signal-translating path including the delay network 30 while an out-of-phase replica of the luminance signal is supplied to the second signal-translating path including the resistor 33. These replicas of the input luminance signal are subsequently combined across the adding resistor 41 in an additive manner so as to produce a resultant output signal which corresponds to the input luminance signal with boosted high-frequency components. This modified output signal is subsequently supplied to the luminance-signal amplifier 17.

The modified nature of the output luminance signal developed across the adding resistor 41 results from the relative phase difference of individual frequency components which are combined thereby. This, in turn, results from the polarity inversion afforded by tube 35 and also from the differences in the phase-shift characteristics of the individual signal-translating paths. Referring now to Fig. 2 of the drawings, there is shown a graph illustrating the amplitude and phase-shift characteristics of the first signal-translating path including the delay network 30. As indicated by the amplitude curve A, the amplitude of a signal passing through the delay network 30 is unaffected by the frequency thereof. The corresponding phase-shift curve $\phi$ is linear and thus indicates that a constant or fixed time delay is provided by the delay network 30 without phase distortion. This will be seen when it is remembered that phase-shift curve $\phi$ is plotted in terms of degrees of a cycle of each frequency considered, where 360° corresponds to one complete cycle. Thus, it is necessary to shift the phase of the high-frequency components a greater fraction of their respective cycles in order to maintain the same time relationship with respect to the lower frequency components. The slope of the phase-shift curve $\phi$ is representative of the time delay of the delay network 30.

Referring to Fig. 3 of the drawings, there is shown the corresponding amplitude and phase-shift curves for the second signal-translating path including the resistor 33. It will be noted that the phase shift imparted to each and every frequency component translated by this path, as represented by curve $\phi$, is the same, namely 180°, which results from the polarity inversion effected by tube 35. Now, because the signals translated by the two paths are combined in an additive manner by the resistor 41, the amplitude and phase-shift characteristics of the two paths are effectively combined to produce resultant or composite amplitude and phase-shift characteristics as indicated by the solid-line curves A and $\phi$ of Fig. 4. The dashed-line curves A′ and $\phi'$ of Fig. 4 represent the corresponding curves of Fig. 1 and are reproduced in Fig. 4 for convenience of comparison.

As is apparent from their respective phase-shift curves, the very low frequency signal components reaching the resistor 41 by way of the two paths are substantially 180° out of phase with one another and, hence, serve to cancel each other. Complete cancellation does not occur in the case illustrated because the signal translated by way of the second path including resistor 33 is attenuated to approximately one-third the amount of the signal translated by way of the first path including the delay network 30. At some higher frequency the corresponding frequency component of the luminance signal translated by the first path including the delay network 30 has been shifted in phase by 180° as a result of the time-delay action of the delay network 30. As a result, this frequency component is in phase with the corresponding frequency component supplied by way of the second path including the resistor 33 and, hence, serves to augment the amplitude of the resultant signal component at this frequency. This frequency is represented by the point at which the resultant amplitude curve A of Fig. 4 reaches a peak value. At some intermediate frequency, the relative phases of the signal components being combined across the resistor 41 are such that the vector sum of the two produces a resultant amplitude equal to the amplitude of the signal translated by the first path alone. This frequency is represented by the point at which the resultant amplitude curve A crosses the amplitude curve A′ of the delay network 30 alone. Thus, as will be seen from Fig. 4, the amplitude of the high-frequency components of the luminance signal is boosted relative to the amplitude of the low-frequency components thereof as the luminance signal is translated by the signal-modifying apparatus 16. The amount of boost obtained is determined by the relative attenuations imparted by the two signal-translating paths operating in conjunction with the resistor network 33, 41 and may be properly adjusted by suitably selecting the parameters of these paths as well as those of the resistor 41.

The resultant phase-shift curve $\phi$ of Fig. 4 departs somewhat from the linearity of the ideal phase-shift curve $\phi'$ of the delay network 30 which has been reproduced in Fig. 4 for convenience of comparison. This nonlinearity of the resultant phase-shift curve $\phi$ may be minimized to an extent such that the resulting phase distortion is held to an unobjectionable amount by properly selecting the relative attenuations of the two signal-translating paths so that the resultant phase-shift characteristic $\phi$ is primarily determined by the signal translated by way of the first path including the delay network 30. This, of course, imposes a limitation on the amount of high-frequency boost that may be obtained. In many applications, however, it just so happens that phase distortion of a converse nature is normally produced in other units of the receiver, so that the phase distortion introduced by the signal-modifying apparatus 16 may well be used to advantage to cancel such phase distortion introduced by other units of the receiver. In this case, the phase distortion of the signal-modifying apparatus 16 does not constitute a limitation but rather a positive advantage of the apparatus.

As mentioned, the delay network 30 is normally included in the luminance channel of color-television receivers in order to equalize the transmission times of the wide band luminance channel and the narrow band chrominance channel in order to produce proper synchronization of the luminance and chrominance information in the reproduced color image. It is also a fact that practical forms of delay networks do not have an ideally flat amplitude response characteristic over an extended frequency range. Thus, time-delay networks, such as the network 30, normally exhibit an increasing amount of attenuation as the frequency of the signal being translated is increased. As a result, the delay network 30 by itself produces some attenuation of the high-frequency components relative to the low-frequency components of the luminance signal. Accordingly, a second signal-translating path in accordance with the teachings of the present invention may advantageously be utilized for the sole purpose of compensating for the high-frequency attenuation normally introduced by the delay network 30 itself.

A major advantage of the present invention is that the signal-modifying apparatus, constructed in accordance therewith, utilizes the delay network 30, which is normally in the color-television receiver anyway, for the purpose of delay equalization between luminance and chrominance channels. Thus, the present invention may be practiced with a minimum of additional components and expense. Frequently, an amplifier or cathode-follower stage is also located adjacent the delay network 30 so that, with slight modification, such amplifier or cathode-follower stage may serve the additional purpose of producing the desired polarity inversion in accordance with the present invention.

The fact that the delay network 30 is also utilized to obtain delay equalization between luminance and chrominance channels also places some limitation on the choice of the frequency component which is to obtain the greatest boost. This arises because of the fact that the frequency component receiving the greatest boost is that frequency component which is supplied by way of the delay network 30 to the resistor 41 with a phase shift of 180°. The frequency component which receives such a phase shift is dependent on amount of time delay provided by the delay network. The relationship between the time delay "$t$" of the delay network 30 and the frequency component "$f_p$" receiving the largest boost is described by the expression $$t=\frac{1}{2f_p}$$

Assuming that a certain time delay is required for producing delay equalization between luminance and chrominance channels, then the above expression may be utilized to determine which frequency component will receive the greatest boost. For some applications, these two requirements may be in conflict in which case the frequency component receiving the greatest boost may be increased, for example, by inserting a small amount of time delay in the second signal-translating path including the resistor 33. Another alternative would be to tap into the delay network 30 at a desired point.

As mentioned, the signal-modifying apparatus of the present invention is not limited to use in the luminance channel of a color-television receiver because, for example, an analogous situation exists with respect to the chrominance channel. More specifically, signal-modifying apparatus in accordance with the present invention may advantageously be utilized in the I-signal chrominance subchannel for performing the dual functions of delay equalization between I and Q subchannels and boost of the high-frequency components of the I chrominance signal relative to the low-frequency components thereof.

The invention, so far, has been described with reference to the situation where it is desired to boost the high-frequency portion of the signal to be modified relative to the low-frequency components thereof. It is apparent, however, that situations may arise where it is desirable to perform a converse type of modification, namely, to boost the low-frequency portions of a signal relative to the high-frequency portions thereof. The apparatus of the present invention may readily be utilized to perform this further type of operation by omitting the provision for inverting the polarity of the signal translated by one of the signal-translating paths of the apparatus 16. In this manner, the low-frequency components of the two sets of signals supplied to adding resistor 41 will be approximately in phase with one another and will, hence, produce the desired low-frequency boost.

From the foregoing description of the invention it will be apparent that signal-modifying apparatus constructed in accordance with the present invention represents new and improved apparatus for use with other apparatus normally including a time-delay network, the signal-modifying apparatus utilizing such time-delay network as a component thereof for obtaining the further result of effecting a desired modification of the signal normally translated by such time-delay network.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-television signal translating apparatus for boosting the amplitude of high-frequency components of a luminance signal translated thereby, the apparatus comprising: a first signal-translating path for translating all the frequency components of the luminance signal with a predetermined time delay; a second signal-translating path for independently translating all the frequency components of the luminance signal with a time delay less than that of said first path by an amount substantially one-half the period of the frequency component which is to receive the largest boost; circuit means for inverting the polarity of the signal translated by one of said paths relative to the polarity of the signal translated by the other of said paths; and circuit means for adding together only these two signals after the mentioned translation and relative polarity inversion to produce a resultant output signal corresponding to the luminance signal but with boosted high-frequency components.

2. Color-television signal translating apparatus for boosting the amplitude of the high-frequency components of a luminance signal translated thereby, the apparatus comprising: a first signal-translating path for translating all the frequency components of the luminance signal with a predetermined time delay; a second signal-translating path for independently translating all the frequency components of the luminance signal with a time delay which is less than that of said first path by an amount which is equal to one-half the period of the frequency component which is to receive the largest boost; circuit means for inverting the polarity of the signal translated by one of said paths relative to the polarity of the signal translated by the other of said paths; and circuit means for adding together only these two signals after the mentioned translation and relative polarity inversion to produce a resultant output signal corresponding to the luminance signal but with amplitude-boosted high-frequency components.

3. Color-television signal translating apparatus for boosting the amplitude of high-frequency components of a luminance signal translated thereby, the apparatus comprising: a first signal-translating path for translating all the frequency components of the luminance signal with a time delay equal to one-half the period of the frequency component which is to receive the largest boost; a second signal-translating path for independently and instantaneously translating all the frequency components of the luminance signal; circuit means for inverting the polarity of the signal translated by one of said paths relative to the polarity of the signal translated by the other of said paths; and circuit means for adding together only these two signals after the mentioned translation and relative polarity inversion to produce a resultant output signal corresponding to the luminance signal but with boosted high-frequency components.

4. In a color-television receiver a subtractive filter for boosting the high-frequency components of a luminance signal translated thereby, the filter comprising: a first signal-translating path including a delay network for translating all the frequency components of the luminance signal with a time delay equal to one-half the period of the frequency component which is to receive the largest boost; a second signal-translating path for independently and instantaneously translating all the frequency components of the luminance signal; a phase-inverter circuit for inverting the polarity of the signal translated by one of said paths relative to the polarity of the signal translated by the other of said paths; and a resistor network for combining only these two signals in an additive manner after the mentioned translation and relative polarity inversion to produce a resultant output signal corresponding to the luminance signal but with boosted high-frequency components.

References Cited in the file of this patent

UNITED STATES PATENTS

| | | |
|---|---|---|
| 1,759,952 | McCurdy | May 27, 1930 |
| 2,024,900 | Wiener et al. | Dec. 17, 1935 |
| 2,617,883 | Anger | Nov. 11, 1952 |
| 2,725,534 | Hemphill | Nov. 29, 1955 |
| 2,729,698 | Fredendall | Jan. 3, 1956 |
| 2,737,628 | Haines | Mar. 6, 1956 |